(12) United States Patent
Li et al.

(10) Patent No.: US 11,615,331 B2
(45) Date of Patent: Mar. 28, 2023

(54) EXPLAINABLE ARTIFICIAL INTELLIGENCE

(71) Applicant: ACCENTURE GLOBAL SOLUTIONS LIMITED, Dublin (IE)

(72) Inventors: Chung-Sheng Li, San Jose, CA (US); Guanglei Xiong, Pleasanton, CA (US); Ashish Jain, Chennai (IN); Emmanuel Munguia Tapia, San Jose, CA (US); Sukryool Kang, Sunnyvale, CA (US); Benjamin Nathan Grosof, Mercer Island, WA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 769 days.

(21) Appl. No.: 16/019,120

(22) Filed: Jun. 26, 2018

(65) Prior Publication Data
US 2019/0244122 A1    Aug. 8, 2019

Related U.S. Application Data

(60) Provisional application No. 62/626,460, filed on Feb. 5, 2018.

(51) Int. Cl.
*G06N 5/04*    (2006.01)
*G06N 20/00*   (2019.01)
(Continued)

(52) U.S. Cl.
CPC .............. *G06N 5/048* (2013.01); *G06N 5/022* (2013.01); *G06N 5/042* (2013.01); *G06N 20/00* (2019.01); *G06N 5/045* (2013.01)

(58) Field of Classification Search
CPC ............ G06N 20/00; G06N 3/00; G06N 5/02; G06N 5/04; G06N 5/022; G06N 5/042;
(Continued)

(56) References Cited

U.S. PATENT DOCUMENTS

| 10,311,442 B1* | 6/2019 | Lancaster | .............. G06Q 99/00 |
| 2006/0053098 A1* | 3/2006 | Gardner | ................ G06F 16/367 |

(Continued)

FOREIGN PATENT DOCUMENTS

JP    5957038 B2    7/2016

OTHER PUBLICATIONS

Foguem, B. Kamsu, et al. "Knowledge formalization in experience feedback processes: An ontology-based approach." Computers in Industry 59.7 (2008): 694-710. (Year: 2008).*

(Continued)

*Primary Examiner* — Kamran Afshar
*Assistant Examiner* — Randall K. Baldwin
(74) *Attorney, Agent, or Firm* — Mannava & Kang, P.C.

(57) ABSTRACT

Examples of artificial intelligence-based reasoning explanation are described. In an example implementation, a knowledge model having a plurality of ontologies and a plurality of inferencing rules is generated. Once the knowledge model is generated, based on a real-world problem, a knowledge model from amongst various knowledge models is selected to be used for resolving a real-world problem. The data procured from the real-world problem is clustered and classified into an ontology of the determined knowledge model. Inferencing rules to be used for deconstructing the real-world problem are identified, and a machine reasoning is generated to provide a hypothesis for the problem and an explanation to accompany the hypothesis.

16 Claims, 12 Drawing Sheets

(51) Int. Cl.
    *G06N 5/02*     (2006.01)
    *G06N 5/048*     (2023.01)
    *G06N 5/022*     (2023.01)
    *G06N 5/045*     (2023.01)

(58) Field of Classification Search
    CPC ........ G06N 5/045; G06N 5/048; G06F 16/35; G06F 16/36; G06F 16/367
    See application file for complete search history.

(56) References Cited

U.S. PATENT DOCUMENTS

| | | | |
|---|---|---|---|
| 2006/0053170 A1* | 3/2006 | Hill | G06F 16/358 |
| 2007/0203693 A1* | 8/2007 | Estes | G06F 16/2425 |
| | | | 704/9 |
| 2008/0270336 A1* | 10/2008 | Talbot | G06N 7/005 |
| | | | 706/46 |
| 2011/0078187 A1* | 3/2011 | Lim | G06F 16/2433 |
| | | | 707/E17.014 |
| 2013/0110518 A1 | 5/2013 | Gruber et al. | |
| 2013/0179388 A1* | 7/2013 | Agarwal | G06Q 10/06 |
| | | | 706/47 |
| 2014/0075004 A1 | 3/2014 | Van Dusen et al. | |
| 2015/0235143 A1* | 8/2015 | Eder | G16H 50/50 |
| | | | 706/12 |
| 2016/0179945 A1* | 6/2016 | Lastra Diaz | G06F 16/284 |
| | | | 707/739 |
| 2017/0213156 A1* | 7/2017 | Hammond | G06F 9/451 |
| 2019/0147369 A1* | 5/2019 | Gupta | G06N 5/045 |
| | | | 706/12 |
| 2019/0214024 A1* | 7/2019 | Gruber | G06F 3/167 |

OTHER PUBLICATIONS

Khan, Atif, John A. Doucette, and Robin Cohen. "A practical medical decision support system using structured knowledge & machine learning techniques." (2012). (Year: 2012).*

Wang, Qingmai. "Developing a Computational Framework for Explanation Generation in Knowledge-based Systems and its Application in Automated Feature Recognition." (2012): i-189 (Year: 2012).*

Holzinger, Andreas, et al. "What do we need to build explainable AI systems for the medical domain?." arXiv preprint arXiv: 1712.09923 (2017). (Year: 2017).*

Zhuang, Yue-ting, et al. "Challenges and opportunities: from big data to knowledge in AI 2.0." Frontiers of Information Technology & Electronic Engineering 18.1 (2017): 3-14. (Year: 2017).*

Reani, Manuele, et al. "How do people use information presentation to make decisions in Bayesian reasoning tasks?." Int. J. Human-Computer Studies 111 (Dec. 2017): 62-77. (Year: 2017).*

Fortuna, Carolina, and Mihael Mohorcic. "Trends in the development of communication networks: Cognitive networks." Computer networks 53.9 (2009): 1354-1376. (Year: 2009).*

Cognilytica Research, "Kyndi Providing Explainable AI Through Advance Knowledge Graphs", Jan. 24, 2018, pp. 1-8.

Bernstein et al., "Toward Intelligent Assistance for a Data Mining Process: An Ontology-Based Approach for Cost-Sensitive Classification", IEEE Transactions on Knowledge and Data Engineering, vol. 17, No. 4, Apr. 1, 2005, pp. 503-518.

Nicolas Graner et al., "The Machine Learning Toolbox Consultant", International Journal of Artificial Intelligence Tools, vol. 02, No. 03, Sep. 1, 1993, pp. 307-328.

* cited by examiner

Potential Reservoir (knowledge) 300

Qualitative Description: Find geobodies in proximity of:
1. Permeable substrate (sandy layer)
2. Convex Volume greater than X
3. Immediately below cap-rock (impermeable).
4. Deep / old enough (not too deep)

```
DETECTING A KNOWLEDGE MODEL THAT IS TO BE USED FOR PROCESSING
A REAL-WORLD PROBLEM
1005
           │
           ▼
DISINTEGRATING THE PROBLEM INTO SMALLER CONSTRUCTS USING
REASONING TECHNIQUES
1010

USING CONCEPTS OF INDUCTIVE REASONING FOR CURATING DATA AND
  CLUSTERING DATA FROM THE REAL-WORLD PROBLEM
  1010-1
           │
           ▼
  IDENTIFYING THE RULE THAT WILL BE APPLICABLE IN THE GIVEN CASE
  IS PERFORMED
  1010-2
           │
           ▼
  PROCESSING THE DECONSTRUCTED PROBLEM AND GENERATING A
  MACHINE REASONING TO PROVIDE A HYPOTHESIS FOR THE PROBLEM
  AND GENERATE AN EXPLANATION TO ACCOMPANY THE HYPOTHESIS
  1010-3
           │
           ▼
PROVIDING THE EXPLANATION OF THE REASONING PROCESS TO USER
1015
```

*FIG. 10*

EXPLAINABLE ARTIFICIAL INTELLIGENCE

PRIORITY

This application claims priority from U.S. Provisional Application No. 62/626,460 filed on Feb. 5, 2018, the disclosure of which is incorporated by reference herein in its entirety.

BACKGROUND

Artificial intelligence, also referred to as AI, uses machine learning techniques at its core to allow machines to emulate certain core aspects of human behavior. In other words, AI allows machines to behave as autonomous systems that are capable of perceiving, learning, taking a decision, and taking an action with little or no human intervention.

The effectiveness of an AI-based system, when used for augmenting human intelligence, is usually measured in terms of the system's ability to explain the decisions and actions to users. While in certain cases the user might agree with a certain action or a decision or altogether forego the need for an explanation from the machine, in most cases, the user may only appreciate or even accept a recommendation given by a machine if the machine is able to explain the logical steps and reasoning used to arrive at that recommendation. For example, the user may not be aware of the reasons of Netflix recommending certain movies; however, the user may still accept the recommendation. But if the machine recommends the user to undergo an invasive medical treatment, then the user may want visibility into the reasoning and intellect used for the recommendation because of the gravity of the situation.

For example, in the Finance and Accounting scenarios, explanations and reasoning are necessary for recommendations for the chart of account code for a journal entry. In another example, in procurement, reasoning and explanations are necessary, for example, to explain the selection of vendors or the final bid. In yet another example, in policy-based content moderation, explanations and reasoning are required for rejected out-of-policy advertisements or social media postings. As another alternate example, in healthcare, explanations for denied claims are mandated as part of the explanation of benefits.

Conventionally, there exist various techniques for explainable AI, a term used for AI which is capable of offering an explanation for the decisions made by it. For example, one technique offers to connect digital media and social media content to the accepted sources of truth. Therefore, this technique provides an explanation as to the authenticity of media content based on whether the content is associated with an authentic source or not. Another technique attempts to classify images based on the description associated with the image and a class definition, and explaining the classification by depicting a connection between the description and the class definition. Yet another technique uses image decomposition for identifying various elements in the image. The different elements of the decomposed image are used to explain the image and the final analysis of the image.

However, most of the above-mentioned machine learning techniques that are used in the explainable AI systems use a feature vector extracted from the input data (which can be time series, text, image, video) and produce an output label, without clearly documenting the explanation as to how and why the label was produced. Other machine reasoning techniques based on forward or backward chaining may not provide a complete provenance of the reasoning process. Many of these techniques do not provide the confidence level of the answer, and rarely take into account the value-at-risk associated with the business context into consideration of the explanation. In many cases, accuracy or confidence level alone is insufficient to determine whether human intervention is needed as the value (or risk) of making the right or wrong decision varies greatly. In addition, the granularity of verification offered by the existing explainable AI systems may not be sufficient for the users to audit the recommendation and ensure that the decision-making can be trusted. Further, in case there is bad decision-making, the user is unable to pinpoint or identify with accuracy the reason for such decision-making.

This presents a technical problem of explainable AI systems in that they may be inefficient in providing an analysis of the solution that they offer. As such, the existing systems may utilize computational and manual resources, which may still lead to an insufficient and an ineffective result. This disclosure involves an explainable AI tool, which addresses the above technical problem in a technical manner.

BRIEF DESCRIPTION OF DRAWINGS

Features of the present disclosure are illustrated by way of examples shown in the following figures. In the following figures, like numerals indicate like elements, in which:

FIGS. 8a, 8b, and 8c illustrate various example of reasoning and explanation performed by the system, according to an example embodiment of the present disclosure;

FIG. 10 illustrates a method of explanation of reasoning or decision, according to an example embodiment of the present disclosure.

DETAILED DESCRIPTION

Figure 1:
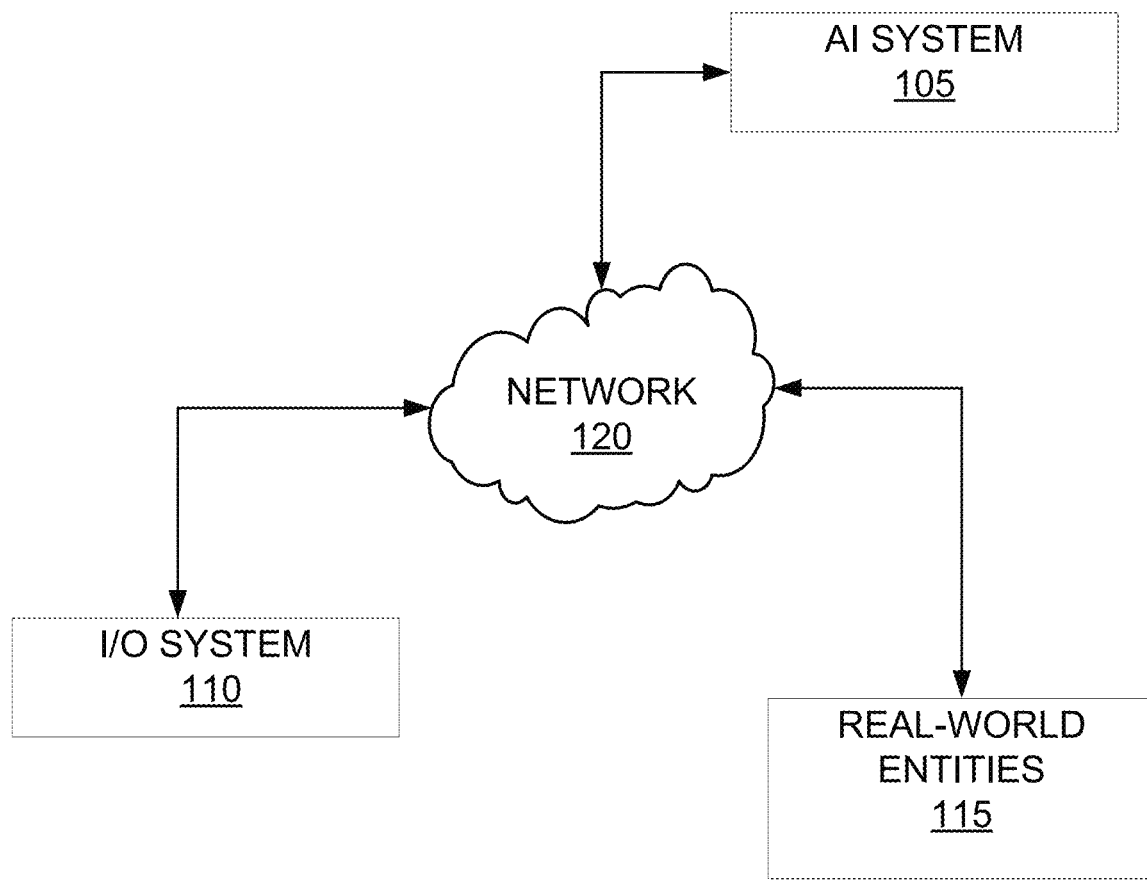
FIG. 1 illustrates a systemic implementation within a network environment, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes systems and methods for artificial intelligence (AI) tools that are capable of deriving logical reasoning from the data that is processed by the artificial intelligence tools and use that logical reasoning to devise an explanation to present to the user. Accordingly, in order to operate as a starting point, the techniques of the present disclosure involve a data-driven ontology and inferencing rule construction. The inferencing rules so constructed are used for developing a reasoning process and also for developing a framework of "confidence" or "trust" levels to indicate the strength of the reasoning process. This is, in unison, used for developing an explainable AI technique to provide an effective manner of illustrating the back-end reasoning process of the AI system at a considerably granular level, which allows the user to make an informed decision or accept a decision made on behalf thereof. In addition, the explainable AI technique also provides a framework to empower the user in identifying possible errors or flaws in the reasoning, the exact step in the process where the errors occurred, and propose solutions in order to address those errors.

As a first step, an ontology is created and associated with the data. In order to achieve this, large amounts of data are parsed frequently and curated to form ontologies and link the data with the ontologies. Specifically, unsupervised learning, for example, k-means clustering, can be used to cluster feature vectors extracted from the entire data, which may be in the form of structured or non-structured data. The ontology is incrementally and continuously refined after the initial creation by the interaction of the AI system with the real world as new data become available. In addition, the curated data is also used for extracting relations and inferencing rules which form the basis of a knowledge model that is being used for the explainable AI, i.e., the basis of the explanation that the AI system ultimately provides to the user.

For example, an ontology of different types of emails and the data is curated, clustered and mapped to the various ontologies. An unsupervised learning technique is used for clustering to determine four clusters; however, when the data is curated and parsed, six ontology labels may be established. The AI system then maps the four clusters to the six ontology labels. The iterative refinement of the ontology and the cluster by interaction with the real world facilitates the AI system in such mapping. For instance, the AI system may establish a hierarchy of clusters using principal component analysis. The AI system then recursively processes the data space in an attempt to establish an ontology and use annotations associated with the data and then map the data into the hierarchical clusters.

As explained earlier, the curated data is also used for extracting inferencing rules and relations. Further, the extracted inferencing rules and relations are triggered using forward or backward chaining. The activation sequence of the inferencing rules within an inferencing engine through forward or backward chaining is referred to as the provenance of reasoning. Therefore, as mentioned above, the AI system of the present disclosure uses a combination of machine learning approaches and inferencing rules (or predicates) to represent the knowledge models.

Extraction of the inferencing rules may be triggered as a result of forward and/or backward chaining process as part of reasoning process. Forward chaining may mean that an AI system starts from an assumption or a fact and then arrives at results, based on that assumption or fact. Backward chaining may mean that an AI system starts from a hypothetical result and establishes an association between the result and the existing facts. In both the cases, the AI system attempts to demonstrate the path of reasoning taken for arriving at a decision and presents that path to the user. That is, the AI system uses various modes for providing explanations to the user and the mode used in a specific instance may be based on a number of factors such as the industry and the purpose due to which the help of the AI system has been sought. This approach can be applied to both a deterministic reasoning framework as well as a probabilistic reasoning framework.

Once the AI system has been developed and set-up in the manner explained above, the AI system may then be used for performing tasks such as classification of fresh, real-world data into results, and providing explanations. In an example, the unsupervised clustering, which contributes to providing the explanation, provides a bottom-up structure of the feature vectors, and provides an alignment between the top-down ontology structure and bottom-up clustering structure, altogether enabling the AI system to explain the classification.

The strength of the explanation is also captured as the "confidence" or "trust" while producing the classification results. In an example, the confidence and trust is evaluated based on how far away one label is from the boundary of another label in the feature vector space. Furthermore, the confidence level is weighed by the "value at risk" of the decision, so that a higher value at risk would require a higher confidence level.

As an example, assume that the classification is supposed to identify contracts that are within the scope to be considered under the new accounting rule. The value of each contract may vary substantially from several thousand dollars to several hundred of million dollars, and hence, the classification of those high value contract will naturally require a much higher confidence.

The presence of the confidence parameter along with the classification may enable proper interpretation of the classification results and the explanation by the user. The technique of the present disclosure allows for the development of an AI system that formulates a classification methodology, which uses predicate structure or the inferencing rules for logic and reasoning, thereby enabling the AI system to arrive at a conclusion and explain that conclusion to the user. In addition, the AI system involves a confluence of the machine learning techniques to achieve the classification, allowing recognition of similar reasoning patterns and invoking similar explainers for explaining that decision. This effectively allows the reuse of previously generated explanations, whenever the inputs are similar to previous cases.

In addition, the present disclosure envisages the development of a knowledge representation, in the form of a visual representation, using machine learning-based approaches. The machine learning-based approaches provide examples and counter examples and can be used as basic building block to construct more complex knowledge models, for example, using fuzzy, logical, spatial, temporal, and spatiotemporal operators. Accordingly, the techniques of the present disclosure can be effective in explaining spatial phenomenon, such as the depth of an oil and gas reservoir, or spatiotemporal patterns, such as corona mass ejection (CME).

FIG. 1 illustrates a network environment 100 implementing an artificial intelligence (AI) system 105, hereinafter referred to as system 105, according to an example embodiment of the present disclosure. In an example embodiment, the system 105 uses Artificial Intelligence (AI) techniques, such as machine learning, data mining, and knowledge discovery, for the purpose of creating a framework to provide an explanation for the decisions taken by the system 105. The system 105 communicates with an input/output (I/O) system 110 and real world entities 115, and utilizes artificial intelligence tools that are capable of deriving logical reasoning from the data gathered from the I/O system 110 and the real world entities 115, hereinafter interchangeably referred to as real world 115. The logical reasoning so derived is used to devise an explanation. The system 105 is capable of generating a data-driven ontology for parsing large amounts of real-world data and sifting through that data for clustering that data. As part of the creating an explanation framework, the system 105 also performs inferencing rule construction. The inferencing rules so constructed are used for developing a reasoning process and also for developing a framework of "confidence" or "trust" levels to indicate the strength of the reasoning process. Given this, the I/O system 110 is enabled and enlightened in order to accept the decision made by the system 105 or propose a better solution to the system 105. Because the system 105 is a machine learning based system, the system 105 reiteratively learns through these interactions, in order to provide better explanations and better decisions to the user.

In an example, the network environment 100 may be a public network environment, including multiple individual computers, laptops, various servers, such as blade servers, and other computational devices and resources. In another example, the network environment 100 may be a private network environment with a limited number of computing devices, such as individual computers, servers, and laptops. Furthermore, the system 105 is implemented in various computing systems, such as a laptop, a desktop computer, quantum computers, a tablet, and the like.

According to an example embodiment, the system 105 communicates directly with the real world entities 115 to obtain data, also referred to as real-world data. The gathered data may be in the form of structured data, unstructured data, and semi-structured data. The unstructured data can include, for instance, text, speech, image, video, seismic data, social media content, and other forms of digital media. The semi-structured data can include, for instance, data from extensible Business Reporting Language (XBRL) files, files and data in extensible markup language (XML) format, and data from Resource Description Framework (RDF) files.

According to an aspect of the present disclosure, the system 105 can gather the real-world data from the real-world entities 115 associated with the system 105 in the network environment 100. The real world entities 115 may be include, for example, sensors, computing devices, and the like. The sensors, for example, may be IoT devices and may include image capturing devices, audio sensors, text analyzers, on-board diagnostics (OBD2) sensors, and the like.

In an example embodiment, the system 105 can be connected to the I/O system 110 and the real-world entities 115 over a network 120. The network 120 may be an individual network or a collection of many such individual networks, interconnected with each other and functioning as a single large network, e.g., the Internet or an intranet. The network 120 may be implemented as one of the different types of networks, such as intranet, local area network (LAN), wide area network (WAN), the Internet, and the like. The infrastructure shown in FIG. 1 may be replaced and upgraded simultaneously as the capabilities and technologies evolve or develop, which is to ensure to surpass any existing and potential "bottlenecks" or "edges".

According to the present disclosure, the system 105 can provide an explainable AI technique created using a knowledge model, which incorporates various ontologies, which are directly related to the application that the system 105 is to be used for and also incorporates various inferencing rules. In one example, the system 105 can provide the explanation by way of data clusters, which are mapped to the ontologies and then used for decision-making by the system 105 and providing a reasoning for the decision made. In another example, the system 105 can use inferencing rules for decision-making and then explain the rule for providing the explanation. In yet another example, the system 105 can use, both, the mapping of data clusters to the ontologies as well as the inferencing rules for decision-making and then providing the reasoning and explanation for the decision. Therefore, for the same problem and the same knowledge model, the system 105 may be able to provide different reasoning processes. For example, based on the knowledge model, the system 105 can trigger the manner of doing explanation, can efficiently select the modalities of reasoning and then may map the ontologies to the data clusters and use the inferencing rules for decision-making and for reasoning.

In operation, the system 105 uses the real-world data for creating an ontology using clustering techniques and also extracting inferencing rules and predicates from the data using various reasoning techniques. The system 105, thereby, creates a knowledge model that can be used for sifting through more data from the real world. The knowledge model is, in that respect, executed in order to draw certain conclusions and inferences from the data and provide an explanation to the user 110. In addition, the system 105 also assimilates the data and comprehends it in order to recursively improve upon itself. The functions of various components of the system 105 are further described in detail in conjunction with FIG. 2.

Figure 2:
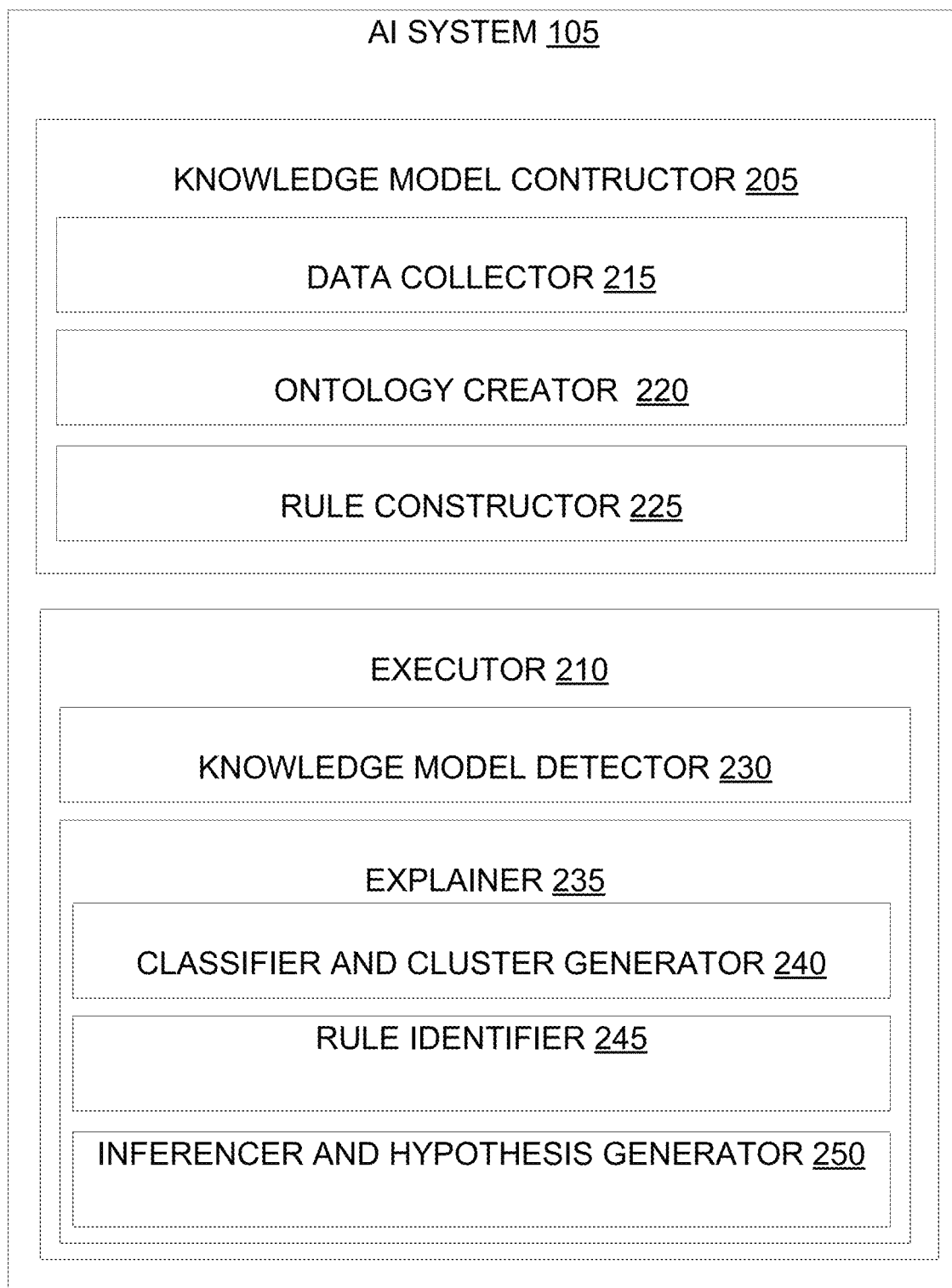
FIG. 2 illustrates a block diagram of the system, according to an example embodiment of the present disclosure.

FIG. 2 illustrates a block diagram of the system 105, according to an example embodiment of the present disclosure. The system 105, amongst other things, includes a knowledge model constructor 205 and an executor 210. The knowledge model constructor 205 includes, but is not limited to, a data collector 215, an ontology creator 220, a rule constructor 225, which are in communication with each other and are together responsible for collecting the data from various real-world sources and utilize the data to build an ontology. The executor 210 includes, but is not limited to, knowledge model detector 230 and an explainer 235, which are in communication with each other. The explainer 235 further includes a classifier & cluster-generator 240, a rule identifier 245, and an inference & hypothesis generator 250.

As mentioned, the system 105 is capable of deriving a decision based on the data that it processes. The data collector 215 can communicate with the real world and procures large amounts of data for the ontology creator 220 to process and generate one or more ontologies and for the rule constructor 225 to create valid inferencing rules, predicates and similar constructs. The ontologies and the inferencing rules and predicates are used for generating a knowledge model which, at a later point, can be used for solving real-world problems and providing an appropriate explanation to the user 110 as part of explainable AI.

The data collector 215 may procure data from various sources, including structured data sources, unstructured data sources, and semi-structured data sources. The unstructured data sources can include, for example, social media and other digital media sources. The unstructured data can include, for instance, text, speech, image, video, seismic data, and other forms of digital media. The semi-structured data sources can include, for instance, extensible Business Reporting Language (XBRL) databases, databases in extensible markup language (XML) format, and Resource Description Framework (RDF) databases.

In turn, the ontology creator 220 uses the data procured by the data collector 215 to create an ontology and associate the data with the ontology. For the purpose, the ontology creator 220 parses large amounts of data and curates that data. For example, the ontology creator 220 may use various types of learning techniques, such as deductive learning techniques, for curating and clustering the data. In one example, the ontology creator 220 can use unsupervised learning including k-means clustering to cluster feature vectors extracted from the entire data. In another case, the ontology creator 220 may use techniques involving supervised classification for the clustering and curation of the entire chunk of data. The clustered data is then used for creating the ontologies and the data is mapped back to the ontologies.

For example, consider an ontology of different types of emails. The ontology creator 220 may perform tasks, such as, sifting through all the data, cluttering the data, and mapping the data to the various ontologies. The ontology creator 220 can apply the deductive reasoning technique, such as unsupervised learning, to cluster the data. In an example embodiment, the ontology creator 220 curates four clusters by processing the data; however, the ontology creator 220 establishes six ontology labels while parsing the data. The ontology creator 220 then appropriately maps the four clusters to the six ontology labels.

In one example, the mapping can be accomplished simply by comparing the ontology assigned to the data and a specific cluster that the data is mapped onto. For instance, a feature vector x can correspond to cluster #3 and ontology label D. The system 105 can then establish the initial hypothesis for the equivalence between cluster #3 and ontology label D. Additional feature vectors may provide additional support for the mapping between cluster #3 and ontology label D, as well as for additional mapping between cluster #3 and ontology label E. This can lead to the conclusion that cluster #3 is equivalent to ontology label D and ontology label E.

In addition, for instance, the ontology creator 220 may establish a hierarchy of clusters from the data using principal component analysis. The ontology creator 220 can then recursively process the data, using the annotations associated with the data and mapping the ontologies to the hierarchical clusters established earlier.

The rule constructor 225 uses the curated data for extracting relations and inferencing rules. These relations and inferencing rules form the basis of the knowledge model that the system 105 uses as part of explainable AI, i.e., the basis of the explanation that the system 105 ultimately provides to the user 110 for a decision made by the system 105. The rule constructor 225 may utilize the extracted inferencing rules and relations, referred to as the provenance of reasoning, for formulating the machine learning approach using inferencing rules (or predicates) to represent the knowledge models.

The rule constructor 225 may employ various reasoning/learning techniques for the extraction of inferencing rules, such as deductive reasoning techniques. For instance, in one case, the rule constructor 225 may trigger the extraction of the inferencing rules and predicates by forward chaining process; while in another instance, the may be triggered as a result backward chaining process, as part of reasoning process. In the first case, as part of the forward chaining technique, the rule constructor 225 can configure the inferencing rules to start from an assumption or a fact and then arrive at results based on that assumption or fact. On the other hand, as part of the backward chaining, the rule constructor 225 can devise inferencing rules that cause the system 105 to start from a hypothetical result and establish an association between the result and the existing facts. In both the cases, the rule constructor 225 devises mechanisms for the system 105 to attempt to demonstrate the path of reasoning taken by the system 105 for arriving at a decision and presents that path to the user 110. This approach can be applied to both deterministic reasoning framework as well as probabilistic reasoning framework.

In addition, the rule constructor 225 can be configured to build into the inferencing rules a strength of the explanation. The strength of explanation provided by the system 105, captured as the "confidence" or "trust" value, while producing the classification results, may enable proper interpretation of the classification results and the explanation by the user.

Therefore, the data collector 215, the ontology creator 220, and the rule constructor 225 operate in a coordinated manner in order to formulate the knowledge model that will be used by the system 105 for reasoning and for explaining the reasoning. Subsequently, the executor 210 can use the knowledge model and process further real-world data for classification or for decision-making. For instance, the executor 210 can encounter a real-world problem in the form of a question or a dilemma, perform tasks such as classification of fresh, real-world data into results, and can also provide a logical explanation for the decision.

Accordingly, the knowledge model detector 230 determines the knowledge model (among inferencing rules, knowledge graph, or a resource description framework) that is to be used for processing the real-world problem. The knowledge models can be defined at the conceptual or functional levels, structure levels, or behavioral levels. Conceptual models may include ontology and predicate logic. The ontology can be expressed in the form of tuples (e.g. Resource Description Framework (RDF) files) or a knowledge graph. The predicate logic includes inferencing rules (capturing 1st order or higher order logic). Structural models include geospatial models (such as a map), social networks. Behavioral models include spatiotemporal models. One or more knowledge models, including the inferencing rules, knowledge graphs, search indices (based on search engines, such as the open source search engines Apache Solr™ AND Elasticsearch™), structural models, and behavioral models may be involved in representing the knowledge model.

The knowledge model detector 230 may use the following methodology for detecting the knowledge model. The knowledge model detector 230 may, first determine (through classification) as to whether the knowledge is conceptual, functional, structural, or behavioral. For conceptual knowledge or functional knowledge, the knowledge model detector 230 may, for example, identify the co-occurrence of entities and relationships that results in the extraction of a knowledge graph, or question answer pairs, or other conceptual or functional knowledge representations. On the other hand, for structural knowledge, the knowledge model detector 230 may extract geospatial or social network knowledge representations, whereas for behavioral-level knowledge, the knowledge model detector 230 may extract spatiotemporal knowledge representations. In another case, the knowledge model detector 230 may detect and extract one or more knowledge models in the same manner as described above.

Once the knowledge model detector 230 has determined the knowledge model that is to be employed for solving the real-world problem at hand, the explainer 235 further takes on the task of finding the solution as well as explaining the background reasoning process to the user 110. Accordingly, the classifier & cluster-generator (CCG) 240 utilizes the concepts of inductive reasoning for curating data and clustering data from the real-world problem. As explained previously with respect to the ontology creator 220, the CCG 240 may, in a similar manner, dissect the real-world problem to classify the data and cluster the data into one or more of the ontologies in the knowledge model identified earlier by the knowledge model detector 230. In one example, the CCG 240 may utilize the techniques of supervised classification for clustering and classifying the data extracted from the real-world problem. In another example, the CCG 240 may employ the unsupervised clustering techniques, such as k-means clustering technique, for clustering and mapping the data extracted from the real-world problem to the knowledge model as ascertained.

Subsequently, the rule identifier 245 performs the role of identifying the inferencing rule that will be applicable in a given case, on the basis of which the system 105 provides the decision and the reasoning for the decision. By way of the various inferencing rules and predicates, the system 105 provides various modes for offering explanations to the user 110 to a decision made by the system 105. The mode, i.e., the inferencing rule, used in a specific instance may be based on a number of factors, such as the industry and the purpose due to which the help of the system 105 has been sought, or the knowledge model which has been determined by the knowledge model detector 230. For instance, the rule identifier 245 may ascertain that for a certain case, the forward chaining process for reasoning might be appropriate whereas for another case, the backward chaining reasoning process might be suitable.

Based on the one or more inferencing rules that is selected for application, the system 105 can deconstruct the real world-problem into smaller constructs. In an example, before providing the explanation or the reasoning in detail, the rule identifier 245 can provide to the I/O system a human-readable form of the deconstruction of the problem. This provides the user 110 a preview of the line of reasoning that the system 105 might take for arriving at a decision.

As an example, the backward chaining process for reasoning as performed by the rule constructor 225 and the rule identifier 245 is described henceforth, according to the present disclosure. In said example, the real-world problem as encountered is that "Eagle Sporting Goods has $2.5 million in inventory and $2 million in accounts receivable. Its average daily sales are $100,000. The firm's payables deferral period is 30 days and average daily cost of sales are $50,000. What is the length of the firm's cash conversion period?". The following options are provided as answer choices: (a) 90 days; (b) 60 days; (c) 50 days; and (d) 40 days. The reasoning performed by the explainer 235, i.e., by the rule identifier 245 and the IHG 250, returns the answer to the above real-world problem and the explanation to the same.

For example, the rule identifier 245 can parse the question to curate logical sentences that encode accounting knowledge in reference to the question. In other words, the natural language question can be encoded into a logical query as shown below:
  i. Question Stem:
  ii. company('Eagle Sporting Goods').
  iii. inventory_of('Eagle Sporting Goods', 2500000).
  iv. receivables_of('Eagle Sporting Goods', 2000000).
  v. payables_deferral_period_of('Eagle Sporting Goods', time_amount(30,days)).
  vi. sales_per_day_of('Eagle Sporting Goods', 90000).
  vii. cost_of_sales_per_day_of('Eagle Sporting Goods', 50000).
  viii. focal_company_of(Q7, 'Eagle Sporting Goods').
  ix. narrow_query_property_of(Q7, cash_conversion_period_of).
  x. Question Alternatives:
  xi. answer_choice(Q7, a, time_amount(100, days)).
  xii. answer_choice(Q7, b, time_amount(60, days)).
  xiii. answer_choice(Q7, c, time_amount(50, days)).
  xiv. answer_choice(Q7, d, time_amount(40, days)).

The rule identifier 245 may dynamically add the encoded question to an overall logical knowledge base, which has accounting knowledge.

In addition, as explained above, the rule identifier 245 can provide to the user 110 a human-readable form of the deconstruction of the problem, thereby, providing to the user 110 a preview of the line of reasoning that the system 105 might take for arriving at a decision. For instance, the encoded logical sentence may be as follows:
  i. inventory_conversion_period_of(?company,
  ii. time_amount(?inventory_conversion_period, days)):—
  iii. average_inventory_of(?company, ?average_inventory) \and
  iv. cost_of_sales_per_day_of(?company, ?cost_of_sales_per_day) \and
  v. ?inventory_conversion_period \is
  vi. ?average_inventory/?cost_of_sales_per_day The above encoded logical sentence may be converted in to a natural language, human-readable sentence as "The inventory conversion period is equal to average inventory divided by cost of goods sold per day".

In another case, the encoded logical sentence may be as follows:
  i. @{'presume average inventory is same as inventory'}
  ii. average_inventory_of(?company, ?inventory):—
  iii. inventory_of(?company, ?inventory).

The above encoded logical sentence may be converted in to a natural language, human-readable sentence as "Presume that average inventory is equal to inventory". In both the above examples, the rule identifier 245 can be configured to read the notation: ":—" to mean "if" and "?" to be prefixed to a logical variable, and "@{ . . . }" can be understood to enclose a prioritization tag used in exception handling.

In the following example, the rule identifier 245 evaluates sub-problems and creates a tree of goals, by matching logical inferencing rules against goals while proceeding depth-first and left-to-right:
  i. Goal1: answer_of(Q7, ?choice).
  b. Found: Inferencing rule1—from general test-taking knowledge—with conditions that become subgoals Goal2, Goal3, Goal4, Goal5, Goal6 c. Goal2: focal_company_of(Q7, ?company).
d. Found: fact Inferencing rule2—from question stem—that satisfies Goal2 with binding ?company='Eagle Sporting Goods'
e. Goal3: narrow_query_property_of(Q7, ?property).
f. Found: fact Inferencing rule3—from question stem—that satisfies Goal3 with binding ?property=cash_conversion_period_of
g. Goal4: ?property(?company, ?time_amount (?raw_value, days).
h. Found: Inferencing rule4—from accounting knowledge about working capital management—with conditions that become subgoals Goal7, Goal8, Goal9, Goal10, Goal11
i. Goal7: company('Eagle Sporting Goods').
j. Found: fact Inferencing rule5—from question stem—that satisfies Goal7
k. Goal8: inventory_conversion_period_of('Eagle Sporting Goods', time_amount(?inventory_conversion_period, days)).
l. Found: Inferencing rule6—from accounting knowledge—that satisfies Goal8 with conditions that become subgoals Goal12, Goal13, Goal14
m. Goal12: average_inventory_of('Eagle Sporting Goods', ?average_inventory).
n. Found: Inferencing rule7—from accounting knowledge—that satisfies Goal12 with a condition that becomes subgoal Goal15
o. Goal15: inventory_of('Eagle Sporting Goods', ?inventory).
p. Found: fact Inferencing rule8—from question stem—that satisfies Goal15 with binding ?inventory=2500000
q. Goal13: cost_of_sales_per_day_of('Eagle Sporting Goods', ?cost_of_sales_per_day).
r. Found: fact Inferencing rule9—from question stem—that satisfies Goal13 with binding ?cost_of_sales_per_day=50000
s. Goal14: ?inventory_conversion_period \is ?average_inventory/?cost_of_sales_per_day
t. Found: builtin arithmetic operation that satisfies Goal14 with binding ?inventory_conversion_period=50.0
u. Goal9: receivables_collection_period_of('Eagle Sporting Goods', time_amount(?receivables_collection_period, days)).
v. Found: Inferencing rule10 that satisfies Goal9 with conditions that become subgoals Goal16, Goal17, Goal18
w. Goal16: receivables_of('Eagle Sporting Goods', ?receivables).
x. Found: fact Inferencing rule11—from question stem—that satisfies Goal16 with binding ?receivables=2000000
y. Goal17: credit_sales_per_day_of('Eagle Sporting Goods', ?credit_sales_per_day).
z. Found: Inferencing rule12—from accounting knowledge—with a condition that becomes subgoal Goal19
aa. Goal19: sales_per_day_of('Eagle Sporting Goods', ?sales_per_day).
bb. Found: fact Inferencing rule13—from question stem—that satisfies Goal19 with binding ?sales_per_day=90000
cc. Goal18: ?receivables_collection_period \is receivable ?credit_sales_per_day
dd. Found: builtin arithmetic operation that satisfies Goal18 with binding ?receivables_collection_period=20.0
ee. Goal10: payables_deferral_period_of('Eagle Sporting Goods', time_amount(?payment_deferral_period, days)).
ff. Found: fact Inferencing rule14—from question stem—that satisfies Goal10 with binding ?payables_deferral_period=30
gg. Goal11: ?cash_conversion_period \is ?inventory_conversion_period+?receivables_collection_period—?payment_deferral_period
hh. Found: builtin arithmetic operation that satisfies Goal11 with binding ?cash_conversion_period=40.0 and thereby satisfies Goal4 with binding ?raw_value=40.0
ii. Goal5: ?raw_value[round→?value]@\basetype
jj. Found: Builtin arithmetic operation that satisfies Goal5 with binding ?value=40
kk. Goal6: answer_choice(Q7, ?choice, time_amount (?value, days)).

Found: fact Inferencing rule15—from question alternatives—that satisfies Goal6 with binding ?choice=d and thereby satisfies Goal1; this finishes the reasoning.

Further, the inferencer & hypothesis generator (IHG) 250 uses the deconstructed problem, and applying various techniques, the IHG 250 may provide a machine reasoning to provide a hypothesis for the problem and an explanation to accompany the hypothesis. In an example, the IHG 250 may use abductive reasoning techniques such as evidence based reasoning techniques, for providing the hypothesis and the explanatory evidence.

For instance, abductive reasoning can be understood as a form of logical inference that proceeds from an observation to a hypothesis that accounts for the observation and, in the process, seeks to find the simplest and most likely explanation. In abductive reasoning, unlike in deductive reasoning, such as backward or forward chaining, the premise does not guarantee the conclusion. Therefore, abductive reasoning can be understood as "an inference to the best explanation".

To provide an example of the abductive reasoning technique used by the IHG 250, consider the following. The observations below lead to the inference or the hypothesis that follows it. The observations are that—(1) The Vice President of Marketing communicated frequently with Sara between 1985 and 1989, (2) Sara communicated with a third party, Tom, several times about cigarettes and children, and (3) A document between Sara and the Vice President of Marketing mentions children. The hypothesis that the HG 250 generates on the basis of these observations, as part of abductive reasoning is that "The Vice President of Marketing knew that cigarette advertisements targeted children by 1989". Accordingly, the IHG 250, in such a case, may be especially effective in analyzing social interaction networks including explicit interaction through organization and implicit interaction through emails, phone log, & instant messages, and in information and concept retrieval.

In addition, the explainer 235 is capable of weighing in the "strength" parameter built into the rules by the rule constructor 225. Accordingly, the inferencer & hypothesis generator 250 can determine the strength or the confidence associated with a decision and the associated explanation and provide that to the user 110. This explained in detail with reference to FIG. 8*a*.

In an example, the explainer 235 is capable of generating a visual representation of the decision as well as the reasoning or the explanation, using machine learning techniques. This is also depicted and explained in detail with reference to FIGS. 3A-3C.

Figure 3B:
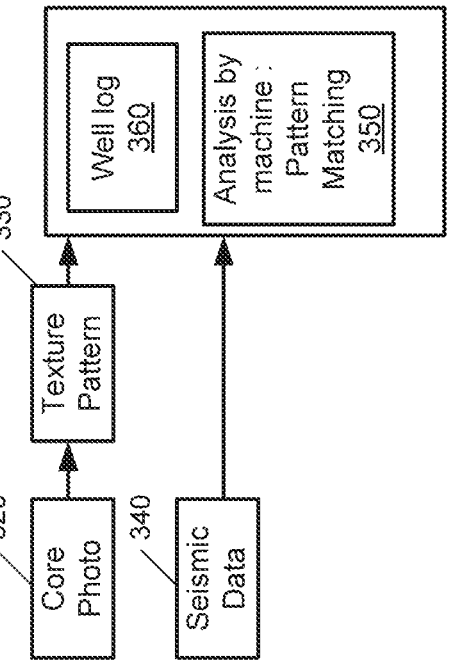
FIGS. 3A to 3C illustrate an example of a structural knowledge model, according to an example embodiment of the present disclosure.
Figure 3C:
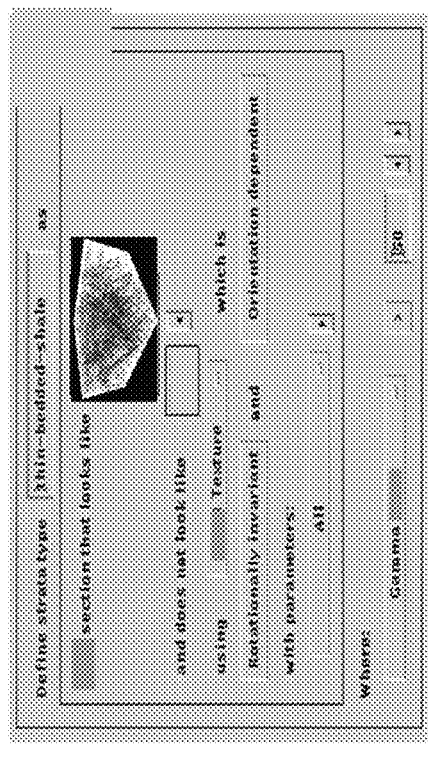
Figure 3A:
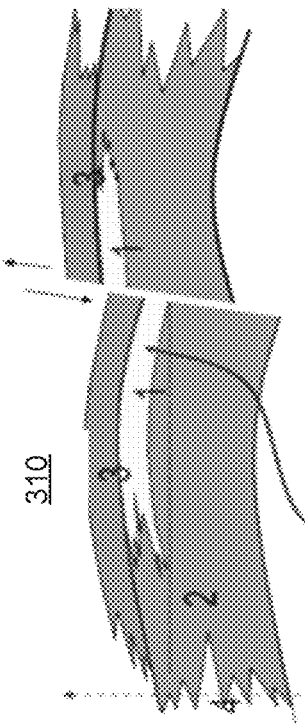

FIGS. 3A-3C illustrates an example of a structural model, according to an example of the present disclosure. As mentioned, the explainer 235 may be configured to develop a knowledge representation, in the form of a visual representation shown in FIGS. 3A-3C, using machine learning-based approaches. The machine learning techniques provide examples and counter examples and can be used as basic building block to construct more complex knowledge models, for example, using fuzzy, logical, spatial, temporal, and spatio-temporal operators.

FIG. 3A illustrates an example of a structural knowledge model. In this example, FIG. 3A illustrates a structure 300 of a potential oil and gas reservoir 310. The structure 300 of the oil and gas reservoir 310 may have a permeable substrate 1 such as, for example, a sandy layer, adjacent to a convex volume 2 underneath an impermeable layer 3, and the entire structure 300 is considerably deep 4. The knowledge model for this structure can be constructed using the knowledge model detector 230. FIG. 3B illustrates a construct of a query that is formulated based on the knowledge of such structure 300 and can then be launched against a large database to search for similar instances of such locations.

FIG. 3C illustrates the process of generation of the structural knowledge model. As can be seen from FIG. 3C, the results of the query formulated in FIG. 3B can serve as the starting point for oil and gas exploration. At block 320 of FIG. 3C, a core photo illustrating the structure 300 of the oil and gas reservoir can be obtained and at block 330, the core photo can be used to generate a textured pattern, again, illustrating various parts of the structure 300, such as the permeable substrate 1, the convex volume 2, and the impermeable layer 3. Using the seismic data at block 340 along with the texture pattern of block 330, the knowledge model detector 230 can detect the associated knowledge model at block 350 by pattern matching. The knowledge model detector 230 may also make use of well logs 360 for detecting the knowledge model.

Figure 4:
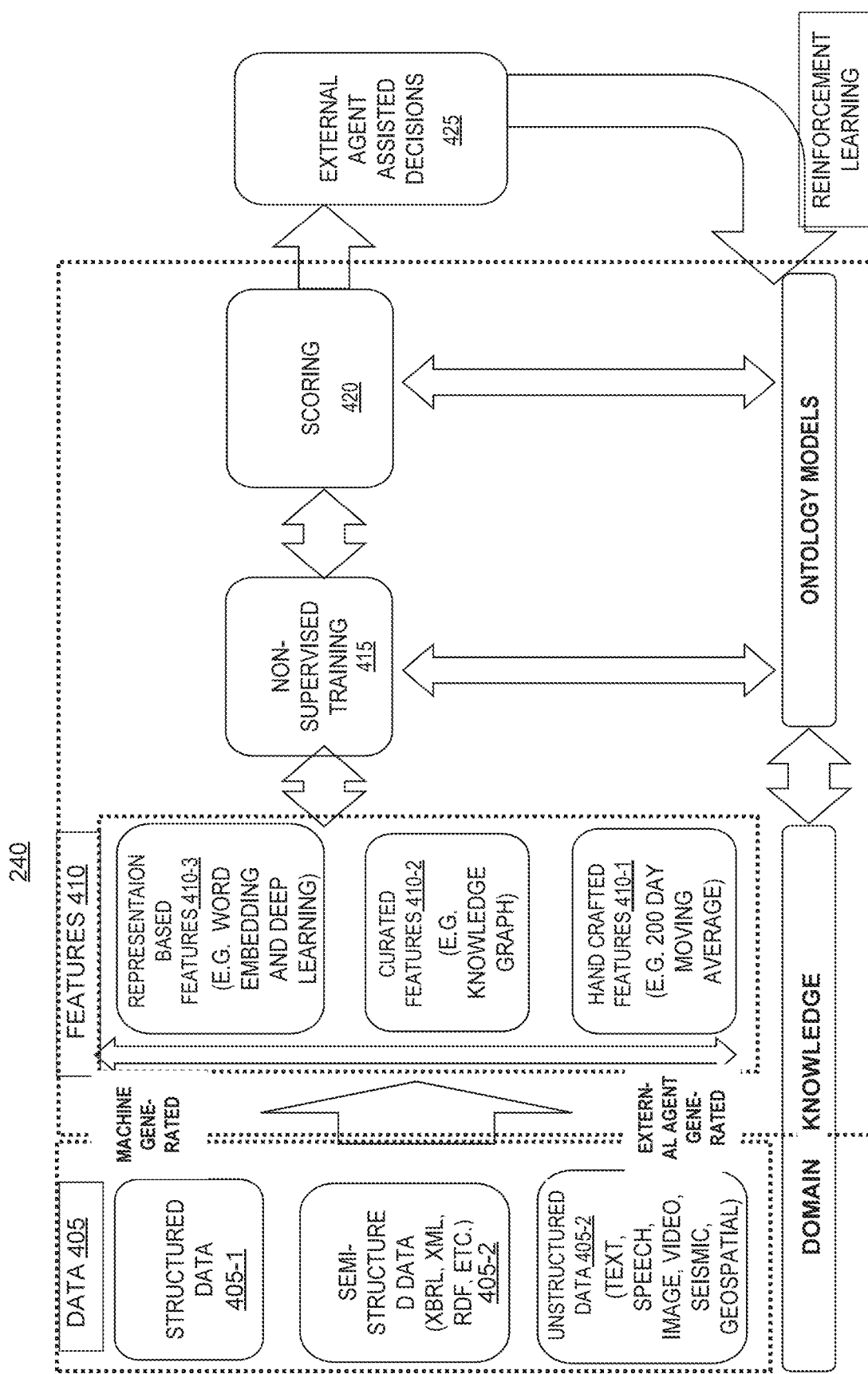
FIG. 4 illustrates a schematic of a component responsible for unsupervised classification of data elements as part of decision-making and explanation, according to an example embodiment of the present disclosure.

FIG. 4 illustrates a schematic of the CCG 240, which is responsible for unsupervised classification of data elements as part of decision-making and explanation, as an example of the present disclosure. As can be seen from the figure, the incoming data 405 can be structured data 405-1, semi-structured data 405-2, or unstructured data 405-3. The extraction of features 410 achieved by the CCG 240 can be entirely hand crafted (e.g. 200 day moving average) to obtain hand crafted features 410-1, curated (e.g. from the knowledge graph) to obtain curated features 410-2, or representation based (e.g. word embedding) in which the features are acquired through machine learning to obtain representation based features 410-3. The CCG 240 then puts the feature vectors through unsupervised training 415 (such as k-means) and scoring 420 to provide external gent assisted decisions 425. Accordingly, the CCG 240 aligns the feature vectors with the ontology. The detailed process of unsupervised training of the feature vector is explained with reference to FIG. 5.

Figure 5:
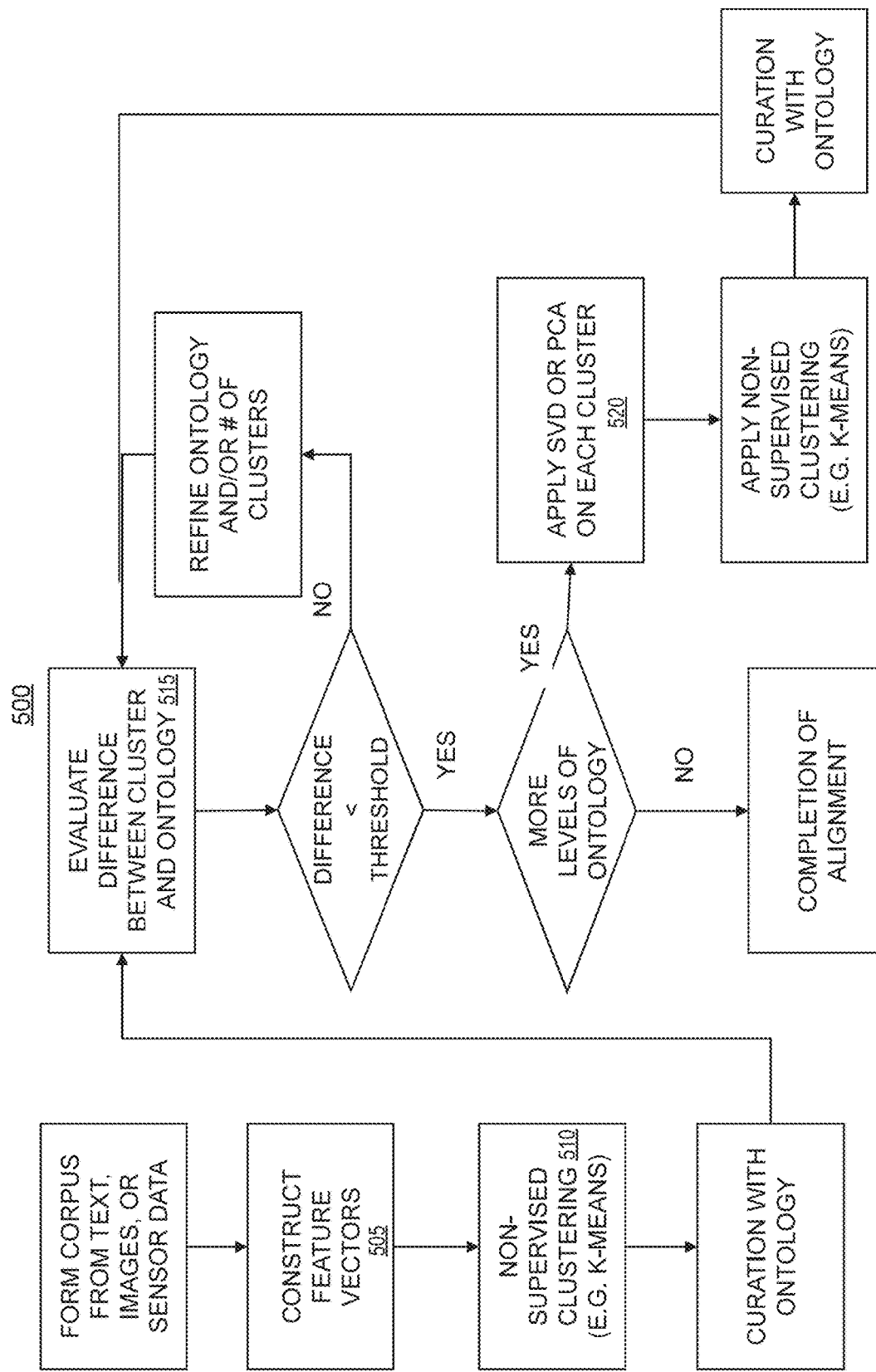
FIG. 5 illustrates a process of unsupervised classification of data elements as part of decision-making and explanation, according to an example embodiment of the present disclosure.

FIG. 5 illustrates a process 500 of non-supervised classification of data elements as part of decision-making and explanation, as an example of the present disclosure. For instance, as mentioned previously, the unsupervised classification is achieved by the CCG 240. In said example, at block 505, the CCG 240 may construct the feature vector from the corpus, text, or images, and the feature vector may be 20-dimensional vector. At block 510, by applying unsupervised clustering (such as k-means), the CCG 240 can cluster the set of feature vectors into 6 clusters. At block 515, by aligning the ontology with the clusters, i.e., by comparing between the ontology and the clusters corresponding to the "known" data, the CCG 240 maps the clusters to the ontology. For a multiple level ontology, as illustrated at block 520, the CCG 240 may potentially apply singular value decomposition or principle value decomposition to top level clusters, followed by clustering after the mapping of the top level ontology is completed. The CCG 240 can then map the sub-clusters to the 2nd level ontology. The CCG 240 can recursively repeat this process until all the ontologies and the clusters have been mapped to each other.

Figure 6:
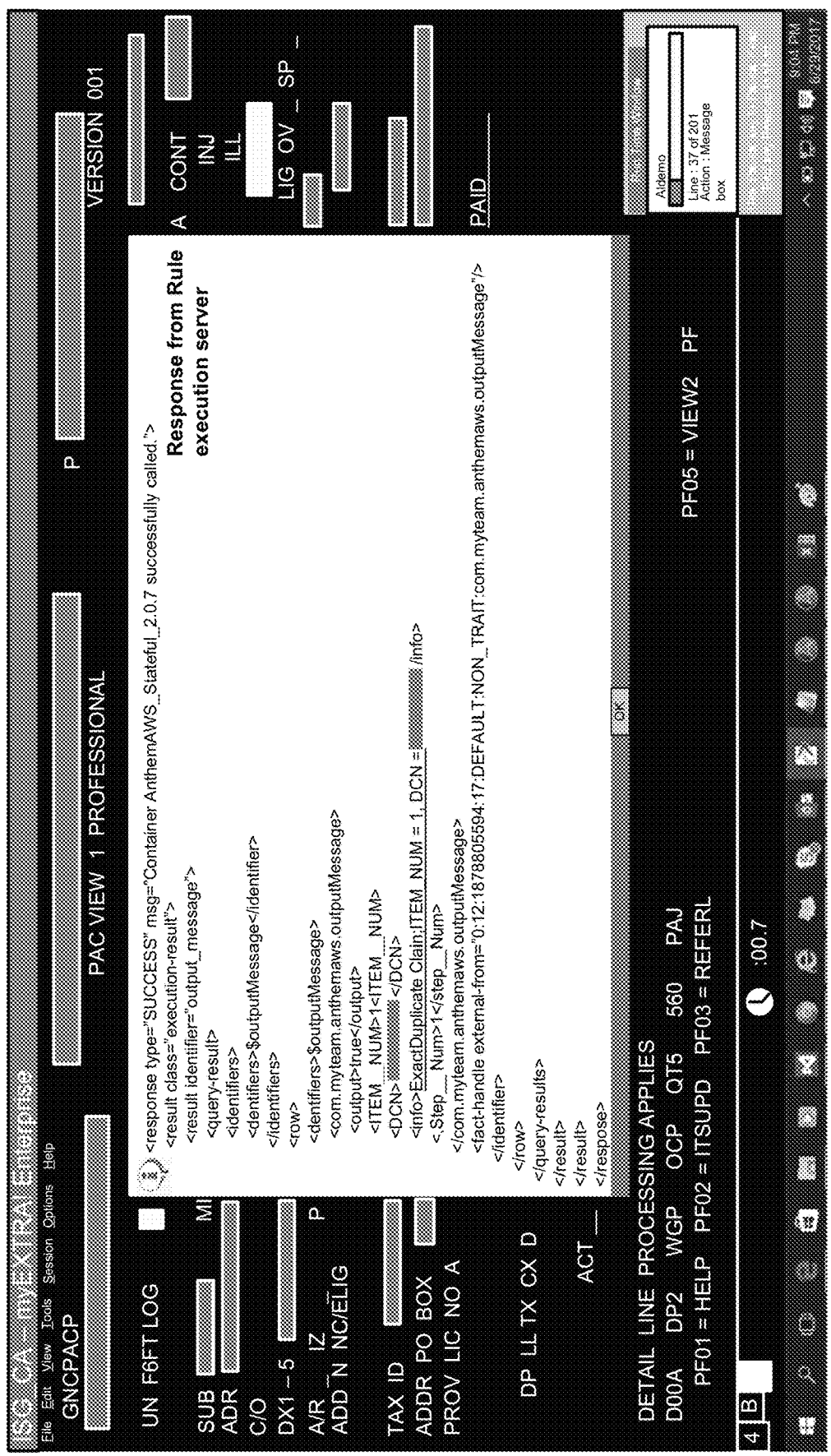
FIG. 6 describes an example of the backward chaining process as part of the deductive reasoning, according to an example embodiment of the present disclosure.

FIG. 6 describes an example of the forward chaining process as part of the deductive reasoning performed by the rule constructor 225 and the rule identifier 245, according to an example of the present disclosure. The example illustrates an example screenshot 600 of a response received upon execution by the rule identifier 245. Based on the response, explainer 235 can generate interpretations and recommendations for the user 110. For instance, the response allows the user 110 to identify lacunas where external inputs can be requested. This allows in easy identification of incomplete or erroneous data, seeking external help to complete or correct data, for example, from the I/O system 110, and achieving effective inferencing and reasoning explanation based on correct and/or error-free data.

Figure 7:
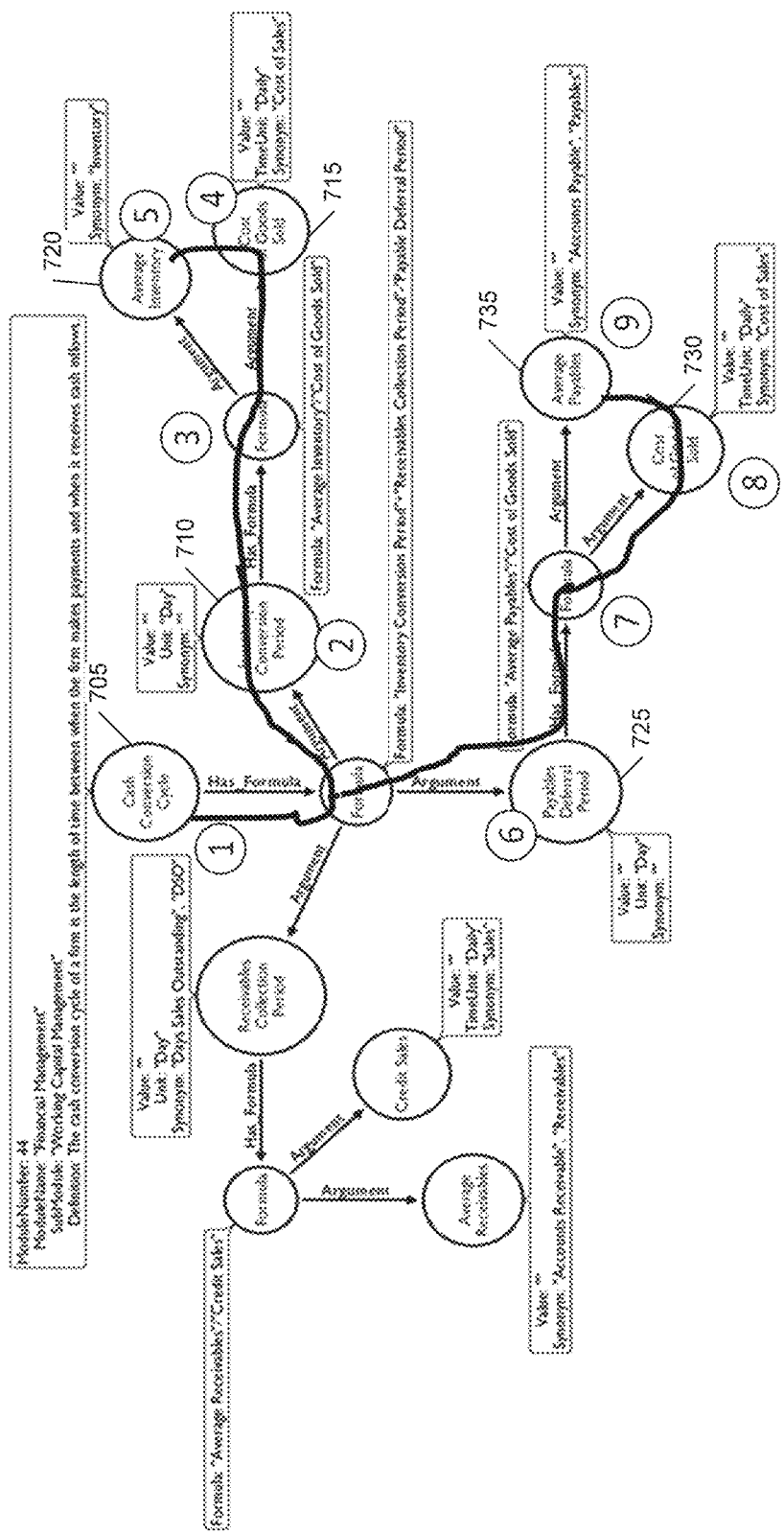
FIG. 7 illustrates a process of provenance of reasoning for traversal of knowledge graph, according to an example embodiment of the present disclosure.

FIG. 7 illustrates a process 700 of provenance of reasoning for traversal of knowledge graph, as performed by the rule identifier 245, as an example of the present disclosure. FIG. 7 illustrates another technique of explaining using the forward chaining process of reasoning. The darkened colored line indicates the line of reasoning for generating the explanation for calculating the cash conversion period. As will be understood, explainable AI is closely associated with the knowledge model that is being used. The illustration of FIG. 7 shows the knowledge model that is selected for the reasoning process and, given a problem that is encountered by the explainer 235, the path that is traversed in the knowledge graph to resolve that problem. For example, the path may start at 705 with cash conversion cycle to inventory conversion period 710 to cost of goods sold 715 and average inventory 720. Further, payable deferral period 725, cost of goods sold 730 and average payables 735 may be obtained. While traversing the path, at multiple instances, to obtain relevant values corresponding formulas may also be obtained.

Figure 8A:
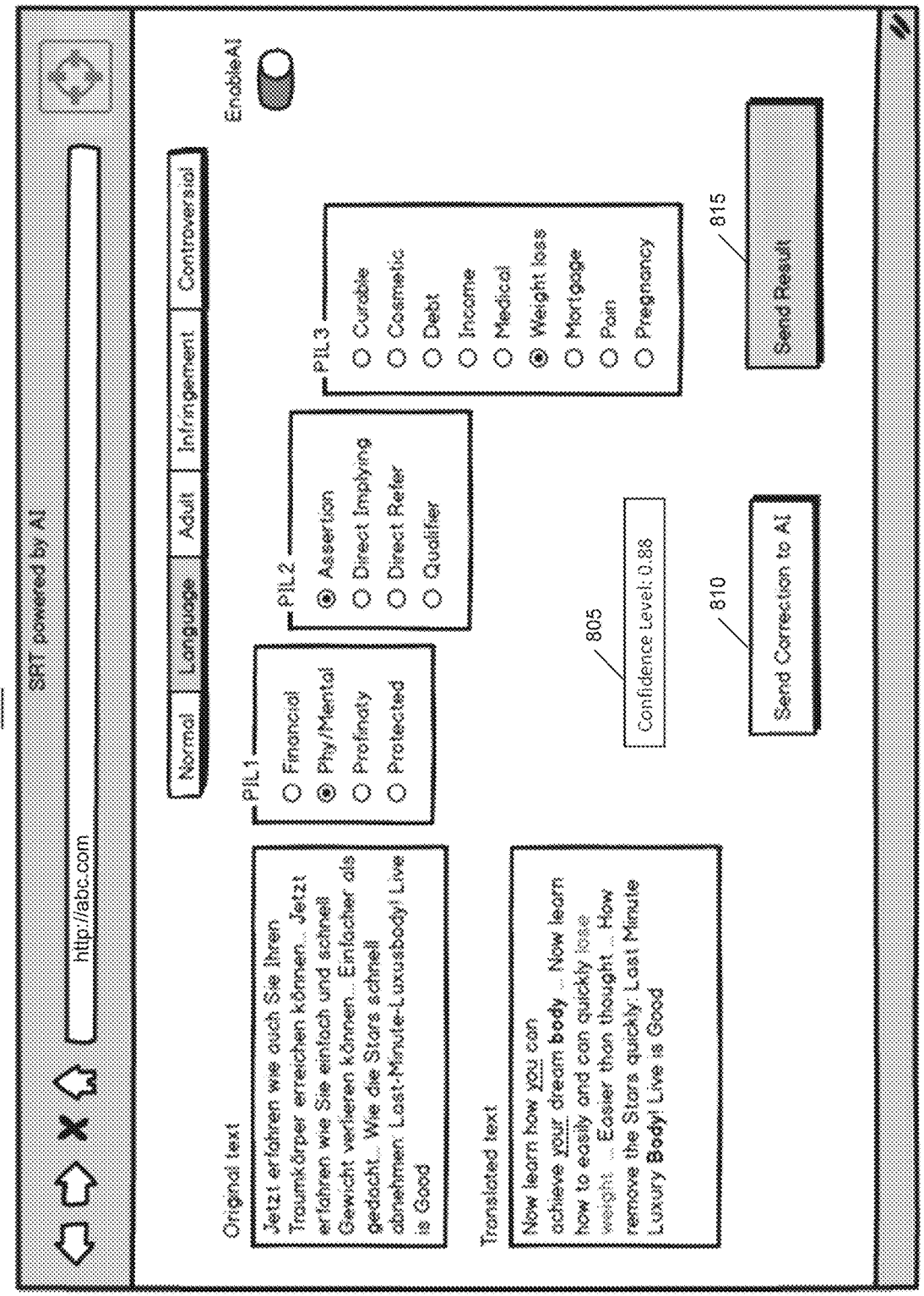
Figure 8C:
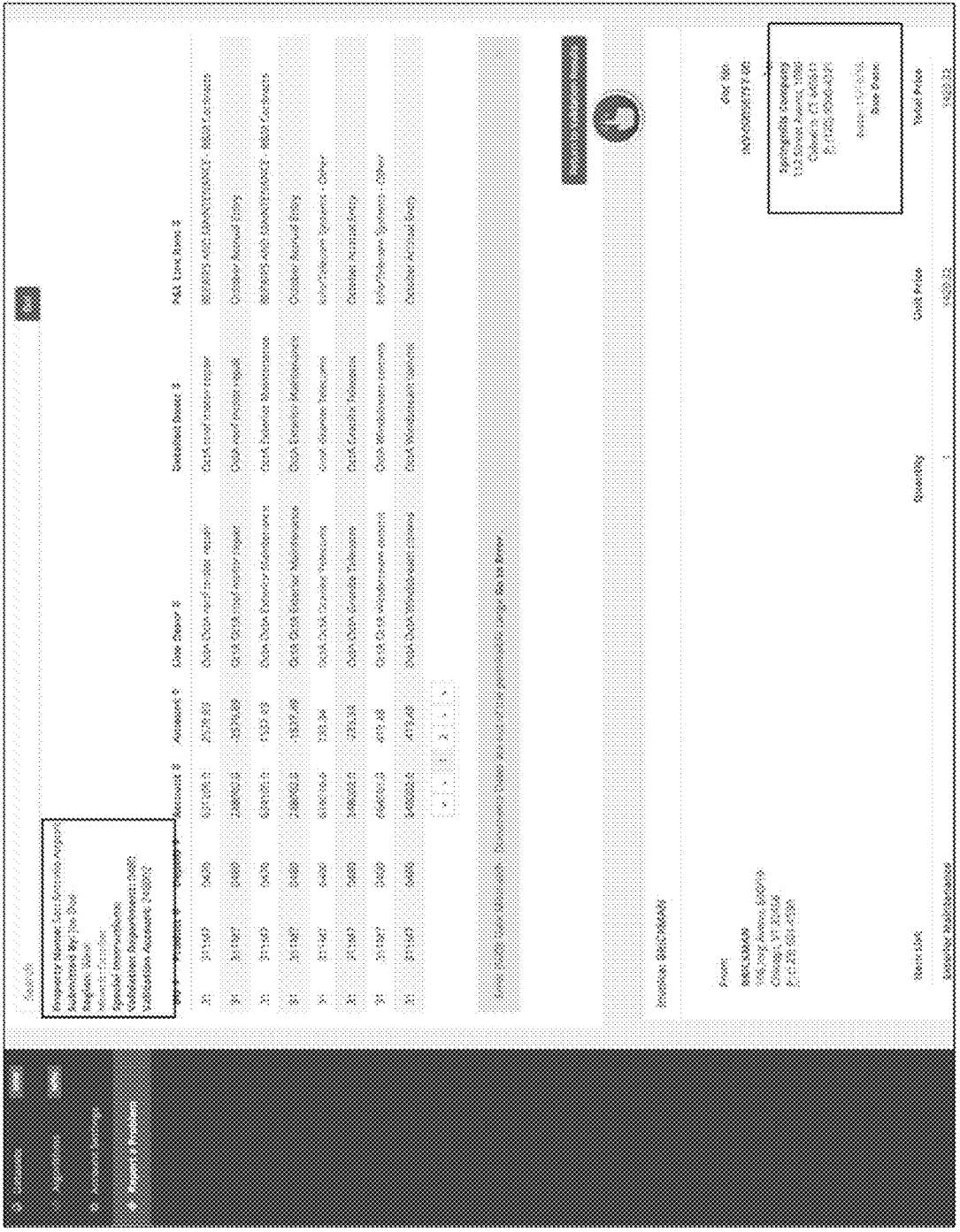

FIGS. 8a, 8b, and 8c illustrate various example of reasoning and explanation performed by the system 105 including the addition of the confidence level parameter. FIG. 8a illustrates an example screenshot 800; FIG. 8b illustrates an example screenshot 830; and FIG. 8c illustrates an example screenshot 860. The screenshot 800 shown in FIG. 8a illustrates the recommended classification of the paragraph provided by the CCG 240 according to a pre-established ontology with a confidence level 805. In case a correction is required, it may be provided through tab 810, and in case no correction is required, results may be sent as illustrated at send result 815. FIGS. 8b and 8c illustrate screenshots 830 and 860 providing the explanation provided by the system 105 after the journal entry validation with the general ledger.

Figure 9:
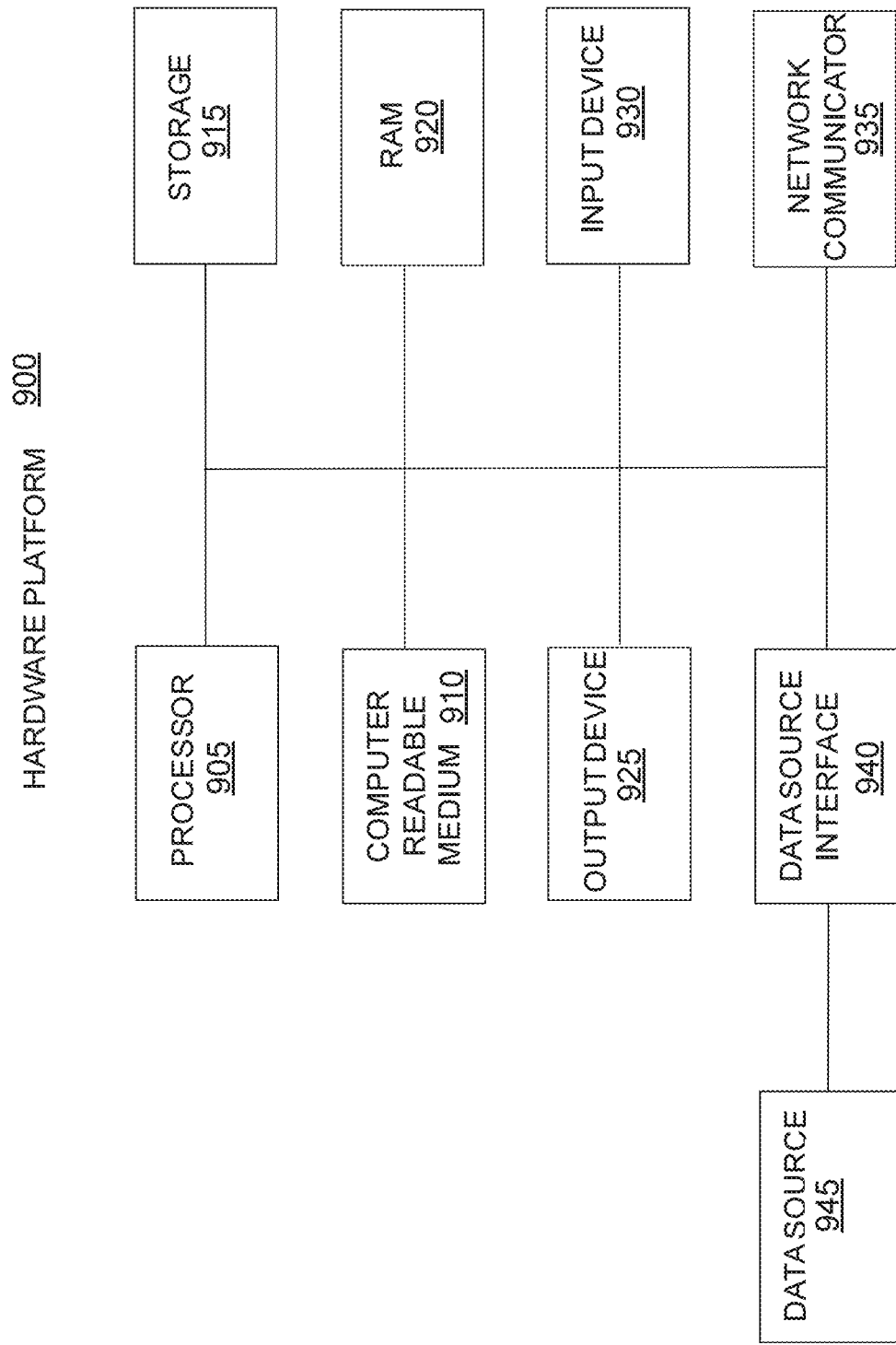
FIG. 9 illustrates a hardware platform for implementation of the system, according to an example embodiment of the present disclosure.

FIG. 9 illustrates a hardware platform 900 for implementation of the system 105, according to an example of the present disclosure. Particularly, computing machines such as but not limited to internal/external server clusters, quantum computers, desktops, laptops, smartphones, tablets and wearables which may be used to execute the system 105 or may have the structure of the hardware platform 900. The hardware platform 900 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Referring to FIG. 9, the hardware platform 900 may be a computer system 900 that may be used with the examples described herein. The computer system 900 may represent a computational platform that includes components that may be in a server or another computer system. The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 900 may include a processor 905 that executes software instructions or code stored on a non-transitory computer readable storage medium 910 to perform methods of the present disclosure. The software code includes, for example, instructions to perform the steps described with reference to the components of the system 105 in FIG. 2 previously. In an example, the knowledge model constructor 205 and the executor 210 may be software codes or components performing these steps.

The instructions on the computer readable storage medium 910 are read and stored the instructions in storage 915 or in random access memory (RAM) 420. The storage 915 provides a large space for keeping static data where at least some instructions could be stored for later execution. The stored instructions may be further compiled to generate other representations of the instructions and dynamically stored in the RAM 920. The processor 905 reads instructions from the RAM 920 and performs actions as instructed.

The computer system 900 further includes an output device 925 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 900 further includes input device 930 to provide a user or another device with mechanisms for entering data and/or otherwise interact with the computer system 900. The input device may include, for example, a keyboard, a keypad, a mouse, or a touchscreen. In an example, output of the executor 210 is displayed on the output device 925. Each of these output devices 925 and input devices 930 could be joined by one or more additional peripherals.

A network communicator 935 may be provided to connect the computer system 900 to a network and in turn to other devices connected to the network including other clients, servers, data stores, and interfaces, for instance. A network communicator 935 may include, for example, a network adapter such as a LAN adapter or a wireless adapter. The computer system 900 includes a data source interface 940 to access data source 945. A data source is an information resource. As an example, a database of exceptions and inferencing rules may be a data source. Moreover, knowledge repositories and curated data may be other examples of data sources.

FIG. 10 illustrates a method 1000 of explanation of reasoning or decision, according to one example method of the present disclosure. At block 1005, a knowledge model that is to be used for processing the real-world problem is detected.

Once the knowledge model has been ascertained, at block 1010, the problem is deconstructed into smaller constructs using reasoning/learning techniques, such as, for example, inductive reasoning techniques, supervised classification techniques, unsupervised clustering techniques, forward chaining, backward chaining, and adductive reasoning techniques. At block 1010-1 of block 1010, concepts of inductive reasoning are utilized for curating data and clustering data from the real-world problem. The techniques of supervised classification for clustering and classifying the data extracted from the real-world problem may be employed. In another example, unsupervised clustering techniques, such as k-means clustering technique, for clustering and mapping the data extracted from the real-world problem to the knowledge model as ascertained may be used.

Subsequently, at block 1010-2 of block 1010, the identification of the inferencing rule that will be applicable in a given case is performed, the inferencing rule being the one on the basis of which the system 105 provides the decision and the reasoning for the decision. The inferencing rule may be based on a number of factors, such as the industry and the purpose due to which the help of the system 105 has been sought, or the knowledge model, which has been determined by the knowledge model detector 230. For instance, the rule identifier 245 may ascertain that for a certain case, the forward chaining process for reasoning might be appropriate whereas for another case, the backward chaining reasoning process might be suitable. Based on the one or more inferencing rules that is selected for application, the real world-problem may be broken down into smaller constructs. In an example, before providing the explanation or the reasoning in detail, the rule identifier 245 can provide to the user 110 a human-readable form of the deconstruction of the problem. This provides the user 110 a preview of the line of reasoning that the system 105 might take for arriving at a decision.

Further, at block 1010-3 of block 1010, the deconstructed problem may be processed and a machine reasoning to provide a hypothesis for the problem and an explanation to accompany the hypothesis is generated. In an example, abductive reasoning techniques, such as evidence based reasoning techniques, for providing the hypothesis and the explanatory evidence may be employed.

Further, at block 1015, the explanation of the reasoning process may be provided to the user 110.

What has been described and illustrated herein are examples of the present disclosure along with some of its variations. The terms, descriptions and figures used herein are set forth via illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. An artificial intelligence (AI) system comprising:
a processor; and
a memory storing instructions, which when executed by the processor, cause the system to:
generate one or more knowledge models, each of the knowledge models comprising a plurality of ontologies and a plurality of inferencing rules for generating an explanation for a decision made by the AI system, wherein, to generate the one or more knowledge models, the processor is configured to:
create the plurality of ontologies based on data procured from real-world interactions, the data procured being real-world data, the real-world data comprising structured data, unstructured data, and semi-structured data; and
construct the plurality of inferencing rules based on the plurality of ontologies and the real-world data procured from the real-world interactions; and
wherein, for decision-making when faced with a real-world problem, the processor is to:
select a knowledge model from the generated one or more knowledge models to be used for resolving the real-world problem, based on the real-world problem; and
execute a decision-making process and generate an explanation for the decision made, wherein, to execute the decision-making process and to generate an explanation for the decision made, the processor is configured to:
classify and cluster data procured from the real-world problem into an ontology of the selected knowledge model by:
clustering the data procured from the real-world problem into a plurality of clusters; and
mapping the plurality of clusters with the plurality of ontologies of the selected knowledge model to refine the clusters and the ontologies;
identify inferencing rules to be used for deconstructing the real-world problem, wherein the identified inferencing rules are triggered using a backward chaining process, wherein in the backward chaining process, the identified inferencing rules are used to evaluate sub-problems from the real-world problem and create a tree of goals, by matching the identified inferencing rules against the corresponding goals while traversing in a depth-first and a left-to-right manner; and
provide a machine-learning based reasoning to provide a hypothesis for the real-world problem and an explanation to accompany the hypothesis, wherein the processor is to determine a confidence level parameter indicating a strength of the explanation for the decision made based on the identified inferencing rules, and wherein the confidence level parameter further indicates "value at risk" of the decision.

2. The AI system as claimed in claim 1, wherein the processor is to generate a visual representation of the decision and the explanation using machine learning techniques.

3. The AI system as claimed in claim 1, wherein the processor is to parse the real-world problem to curate logical sentences in the real-world problem.

4. The AI system as claimed in claim 1; wherein the processor is to provide a human-readable form of the deconstruction of the real-world problem to preview a line of reasoning.

5. An AI system comprising:
a processor; and
a memory storing instructions, which when executed by the processor, cause the system to:
generate one or more knowledge models, each of the knowledge models comprising a plurality of ontologies and a plurality of inferencing rules for generating an explanation for a decision made by the AI system, wherein, to generate the one or more knowledge models, the processor is configured to:
create the plurality of ontologies based on data procured from real-world interactions, the data procured being real-world data, the real-world data comprising structured data, unstructured data, and semi-structured data, wherein the processor is to utilize inductive reasoning techniques for creating the ontology; and
construct the plurality of inferencing rules based on the plurality of ontologies and the real-world data procured from the real-world interactions, wherein the processor is to utilize deductive reasoning techniques for creating the plurality of inferencing rules; and
wherein, for decision-making when faced with a real-world problem, the processor is to:
select a knowledge model from the generated one or more knowledge models to be used for resolving the real-world problem, based on the real-world problem; and
execute a decision-making process and generate an explanation for the decision made, wherein, to execute the decision-making process and to generate an explanation for the decision made, the processor is configured to:
classify and cluster data procured from the real-world problem into an ontology of the selected knowledge model by:
clustering the data procured from the real-world problem into a plurality of clusters; and
mapping the plurality of clusters with the plurality of ontologies of the selected knowledge model to refine the clusters and the ontologies;
identify inferencing rules to be used for de-constructing the real-world problem, wherein the processor is to utilize the deductive reasoning techniques for deconstructing the real-world problem, wherein the identified inferencing rules are triggered using a backward chaining process, wherein in the backward chaining process, the identified inferencing rules are used to evaluate sub-problems from the real-world problem and create a tree of goals, by matching the identified inferencing rules against the corresponding goals while traversing in a depth-first and a left-to-right manner;
provide a machine-generated reasoning to provide a hypothesis for the problem and an explanation to accompany the hypothesis, wherein abductive reasoning techniques are utilized for providing the hypothesis and the explanation; and
determine a confidence parameter, indicative of a strength of the explanation for the decision made based on the identified inferencing rules, wherein the confidence level parameter further indicates "value at risk" of the decision.

6. The AI system as claimed in claim 5, wherein the processor is to build a strength of the explanation into the inferencing rules.

7. The AI system as claimed in claim 5, wherein the processor is to parse the real-world problem to curate logical sentences in the real-world problem.

8. The AI system as claimed in claim 5, wherein the processor is to provide a human-readable form of the deconstruction of the real-world problem to preview a line of reasoning.

9. The AI system as claimed in claim 5, wherein the inductive reasoning techniques comprise one of supervised clustering techniques and unsupervised clustering techniques.

10. The AI system as claimed in claim 5, wherein the abductive reasoning techniques comprise evidence-based reasoning techniques.

11. A non-transitory computer readable medium including machine readable instructions that are executable by a processor to:
generate one or more knowledge models, each of the knowledge models comprising a plurality of ontologies and a plurality of inferencing rules for generating an explanation for a decision made by an AI system, wherein generating the one or more knowledge models comprises creating the plurality of ontologies based on data procured from real-world interactions using inductive reasoning techniques for creating the ontology, and creating the plurality of inferencing rules based on the plurality of ontologies and the data procured from the real-world interactions using deductive reasoning techniques tor creating the plurality of inferencing rules;
determine a knowledge model from the generated one or more knowledge models to be used for resolving a real-world problem, based on the real-world problem;
classify and cluster data procured from the real-world problem into an ontology of the determined knowledge model by:
  clustering the data procured from the real-world problem into a plurality of dusters; and
  mapping the plurality of clusters with the plurality of ontologies of the determined knowledge model to refine the clusters and the ontologies;
identify inferencing rules to be used for deconstructing the real-world problem using deductive reasoning techniques for deconstructing the real-world problem, wherein the identified inferencing rules are triggered using a backward chaining process, wherein in the backward chaining process, the identified inferencing rules are used to evaluate sub-problems from the real-world problem and create a tree of goals, by matching the identified inferencing rules against the corresponding goals while traversing in a depth-first and a left-to-right manner;
provide a machine-learning based reasoning to provide a hypothesis for the problem and an explanation to accompany the hypothesis using abductive reasoning techniques for providing the hypothesis and the explanation; and
determine a confidence parameter, indicative of a strength of the explanation for the decision made based on the identified inferencing rules, wherein the confidence level parameter further indicates "value at risk" of the decision.

12. The non-transitory computer readable medium as claimed in claim 11, wherein to provide the machine-learning based reasoning, the processor is to generate a visual representation of the decision and the explanation using machine learning techniques.

13. The non-transitory computer readable medium as claimed in claim 11, wherein to identify the inferencing rule, the processor is to parse the real-world problem to curate logical sentences in the real-world problem.

14. The non-transitory computer readable medium as claimed in claim 11, where-in to identify the inferencing rule, the processor is to provide a human-readable form of the deconstruction of the real-world problem to preview of a line of reasoning.

15. The non-transitory computer readable medium as claimed in claim 11, where-in the inductive reasoning techniques comprise one of supervised clustering techniques and unsupervised clustering techniques.

16. The non-transitory computer readable medium as claimed in claim 11, where-in the abductive reasoning techniques comprise evidence-based reasoning techniques.

* * * * *